United States Patent
Bjornson et al.

(10) Patent No.: US 10,567,518 B2
(45) Date of Patent: Feb. 18, 2020

(54) AUTOMATIC DISCOVERY AND ONBOARDING OF ELECTRONIC DEVICES

(71) Applicant: Western Digital Technologies, Inc., Irvine, CA (US)

(72) Inventors: Eric S. Bjornson, Sunnyvale, CA (US); Rajesh K. Batra, Los Altos, CA (US); Cipson Jose Chiriyankandath, Santa Clara, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 506 days.

(21) Appl. No.: 14/752,716

(22) Filed: Jun. 26, 2015

(65) Prior Publication Data
US 2016/0381149 A1 Dec. 29, 2016

(51) Int. Cl.
*H04L 29/08* (2006.01)
*H04L 29/12* (2006.01)
*H04L 12/24* (2006.01)

(52) U.S. Cl.
CPC .......... *H04L 67/16* (2013.01); *H04L 41/0803* (2013.01); *H04L 41/0806* (2013.01);
(Continued)

(58) Field of Classification Search
CPC ............. H04L 61/2076; H04L 61/2503; H04L 61/2514; H04L 67/16; H04L 12/2809;
(Continued)

(56) References Cited

U.S. PATENT DOCUMENTS 6,343,360 B1 * 1/2002 Feinleib .............. G06F 9/44505 713/1
6,499,054 B1 12/2002 Hesselink et al.
(Continued)

FOREIGN PATENT DOCUMENTS

WO 02-102012 A2 12/2002
WO 2014-077457 A1 5/2014

OTHER PUBLICATIONS

International Search Report dated Sep. 6, 2016 for PCT/US2016/038556.
Written Opinion dated Sep. 6, 2016 for PCT/US2016/038556.

*Primary Examiner* — Vivek Srivastava
*Assistant Examiner* — William C McBeth
(74) *Attorney, Agent, or Firm* — Chang & Hale LLP

(57) ABSTRACT

A computing device configured to facilitate on-boarding of an electronic device may comprise a processor and memory. The memory may store instructions that cause the processor to receive, over a public network, a first communication from the electronic device on a private network, comprising an address of the electronic device on the private network. A first identifier associated with the address of the electronic device on the public network and the received address of the electronic device on the private network may be stored in a persistent store. The computing device may then receive a first request from a browser and, based upon a second identifier associated therewith, retrieve the stored address of the electronic device on the private network. The retrieved address of the electronic device on the private network may then be sent, over the public network, in response to the received first request from the browser.

21 Claims, 2 Drawing Sheets

(52) U.S. Cl.
CPC ...... *H04L 41/0883* (2013.01); *H04L 61/2076* (2013.01); *H04L 61/2514* (2013.01); *H04L 67/02* (2013.01); *H04L 67/1097* (2013.01)

(58) Field of Classification Search
CPC . H04L 41/08; H04L 41/0803; H04L 41/0806; H04L 41/0876; H04L 41/0879; H04L 41/0883; H04L 61/2053; H04L 67/02; H04L 67/1097; H04L 41/22; H04N 21/43615
See application file for complete search history.

(56) References Cited

U.S. PATENT DOCUMENTS

| | | | |
|---|---|---|---|
| 6,732,158 | B1 | 5/2004 | Hesselink et al. |
| 6,993,596 | B2 | 1/2006 | Hinton et al. |
| 7,120,692 | B2 | 10/2006 | Hesselink et al. |
| 7,454,443 | B2 | 11/2008 | Ram et al. |
| 7,467,187 | B2 | 12/2008 | Hesselink et al. |
| 7,546,353 | B2 | 6/2009 | Hesselink et al. |
| 7,587,467 | B2 | 9/2009 | Hesselink et al. |
| 7,600,036 | B2 | 10/2009 | Hesselink et al. |
| 7,701,934 | B2 * | 4/2010 | Walter ............... H04L 41/28 370/389 |
| 7,788,404 | B2 | 8/2010 | Hesselink et al. |
| 7,917,628 | B2 | 3/2011 | Hesselink et al. |
| 7,934,251 | B2 | 4/2011 | Hesselink et al. |
| 7,949,564 | B1 | 5/2011 | Hughes et al. |
| 8,004,791 | B2 | 8/2011 | Szeremeta et al. |
| 8,255,661 | B2 | 8/2012 | Karr et al. |
| 8,285,965 | B2 | 10/2012 | Karr et al. |
| 8,341,117 | B2 | 12/2012 | Ram et al. |
| 8,341,275 | B1 | 12/2012 | Hesselink et al. |
| 8,352,567 | B2 | 1/2013 | Hesselink et al. |
| 8,526,798 | B2 | 9/2013 | Hesselink |
| 8,631,284 | B2 | 1/2014 | Stevens |
| 8,646,054 | B1 | 2/2014 | Karr et al. |
| 8,661,507 | B1 | 2/2014 | Hesselink et al. |
| 8,688,797 | B2 | 4/2014 | Hesselink et al. |
| 8,713,265 | B1 | 4/2014 | Rutledge |
| 8,762,682 | B1 | 6/2014 | Stevens |
| 8,780,004 | B1 | 7/2014 | Chin |
| 8,793,374 | B2 | 7/2014 | Hesselink et al. |
| 8,799,989 | B1 | 8/2014 | Liu |
| 8,819,443 | B2 | 8/2014 | Lin |
| 2002/0147797 | A1 * | 10/2002 | Paul ................ H04L 67/1097 709/220 |
| 2003/0084162 | A1 * | 5/2003 | Johnson ............ H04L 61/2514 709/227 |
| 2003/0212795 | A1 * | 11/2003 | Harris .............. H04L 61/2514 709/227 |
| 2003/0233454 | A1 * | 12/2003 | Alkhatib ........... H04L 61/2514 709/226 |
| 2004/0167973 | A1 * | 8/2004 | Shima ............... H04L 29/12009 709/220 |
| 2005/0144195 | A1 | 6/2005 | Hesselink et al. |
| 2005/0144200 | A1 | 6/2005 | Hesselink et al. |
| 2005/0235283 | A1 * | 10/2005 | Wilson ............... G06F 9/44505 717/178 |
| 2007/0036152 | A1 * | 2/2007 | Giordano, III ........ H04L 41/082 370/352 |
| 2007/0133567 | A1 * | 6/2007 | West .................. H04L 41/0803 370/395.54 |
| 2008/0028042 | A1 * | 1/2008 | Bealkowski ........ H04L 41/0803 709/219 |
| 2008/0077425 | A1 * | 3/2008 | Johnson ............. H04L 41/0803 705/301 |
| 2009/0037556 | A1 * | 2/2009 | Kokkinen ............ H04L 12/2809 709/217 |
| 2009/0183086 | A1 * | 7/2009 | Solyanik ............. G06F 17/3089 715/744 |
| 2011/0010437 | A1 * | 1/2011 | Christenson ............. H04L 12/00 709/222 |
| 2011/0219062 | A1 * | 9/2011 | Allen ................. H04L 61/2567 709/203 |
| 2012/0036041 | A1 | 2/2012 | Hesselink |
| 2012/0036233 | A1 * | 2/2012 | Scahill ................ H04L 61/2076 709/220 |
| 2012/0239221 | A1 * | 9/2012 | Mighdoll ........... G05D 23/1902 700/300 |
| 2012/0317260 | A1 * | 12/2012 | Husain .................... H04L 41/08 709/223 |
| 2013/0054738 | A1 * | 2/2013 | Borges ................. H04M 15/43 709/217 |
| 2013/0097337 | A1 * | 4/2013 | Chien ................. H04L 41/0886 709/250 |
| 2013/0212401 | A1 | 8/2013 | Lin |
| 2013/0266137 | A1 | 10/2013 | Blankenbeckler et al. |
| 2013/0268749 | A1 | 10/2013 | Blankenbeckler et al. |
| 2013/0268759 | A1 | 10/2013 | Blankenbeckler et al. |
| 2013/0268771 | A1 | 10/2013 | Blankenbeckler et al. |
| 2014/0075488 | A1 * | 3/2014 | Christudass ........ H04L 41/5058 725/114 |
| 2014/0095439 | A1 | 4/2014 | Ram |
| 2014/0169921 | A1 | 6/2014 | Carey |
| 2014/0173215 | A1 | 6/2014 | Lin et al. |
| 2014/0195690 | A1 * | 7/2014 | Harrison ............... H04L 12/189 709/228 |
| 2014/0229585 | A1 * | 8/2014 | Wouhaybi ........... H04L 41/0803 709/220 |
| 2014/0364056 | A1 * | 12/2014 | Belk .................... H04B 5/0031 455/41.1 |
| 2016/0173450 | A1 * | 6/2016 | Mircescu .............. H04L 41/22 726/14 |
| 2016/0182604 | A1 * | 6/2016 | Ensign ................ H04L 67/02 709/217 |
| 2018/0092143 | A1 * | 3/2018 | Gogineni ............. H04W 76/10 |

* cited by examiner

AUTOMATIC DISCOVERY AND ONBOARDING OF ELECTRONIC DEVICES

BACKGROUND

Embodiments are related to configuring an electronic device for use on a network. In particular, embodiments are related to configuring a data storage device such as a Network Attached Storage (NAS) on a Local Area Network (LAN), such as may occur when the user firsts connects a new data storage device to his or her LAN.

DETAILED DESCRIPTION

Many devices that are configured to operate in computer networks have no or very limited user interfaces. For example, data storage devices such as network attached storage (NAS) computing devices typically do not comprise a display or a keyboard that would enable a user to perform the initial device setup, a process that is also called on-boarding. Currently, the user migrates data to his or her new NAS using a dedicated application that is at least initially stored on the NAS. This can be cumbersome and puts the user in an unfamiliar environment. Users are, however comfortable with using web browsers to carry out a great many tasks. However, detecting electronic devices in a local network from a sandboxed environment (e.g., a protocol-restricted and security-constrained environment) such as a web browser may be difficult. Indeed, in order to perform the initial setup process to enable access to and use of the electronic device on the local network, the electronic device must first be detected on the local network using the web browser.

It is critical for a user's newly-purchased device (or an existing device moved to a new network) to be reliably discovered and accessed on the network. If this is not the case, the device is effectively invisible on the network and might as well be non-existent. Device auto-discovery, at least on mobile devices, is conventionally carried out via Bonjour or other network technologies, which provides a general method to discover services on a local area network. Digital Living Network Alliance (DLNA) is one example of such network technologies. DLNA defines interoperability guidelines to enable sharing of digital media between multimedia devices, media management, discovery and control. Such device/service discovery technologies are used for service discovery, address assignment, and hostname resolution. However, they are based on broadcast technologies and can be disabled using router configurations, and thus reducing the reliability of device discovery. There is no reliable technology that is both technology and platform independent that allows any applications including the sandboxed applications such as browsers to reliability detect interested devices in the local network.

Figure 1:
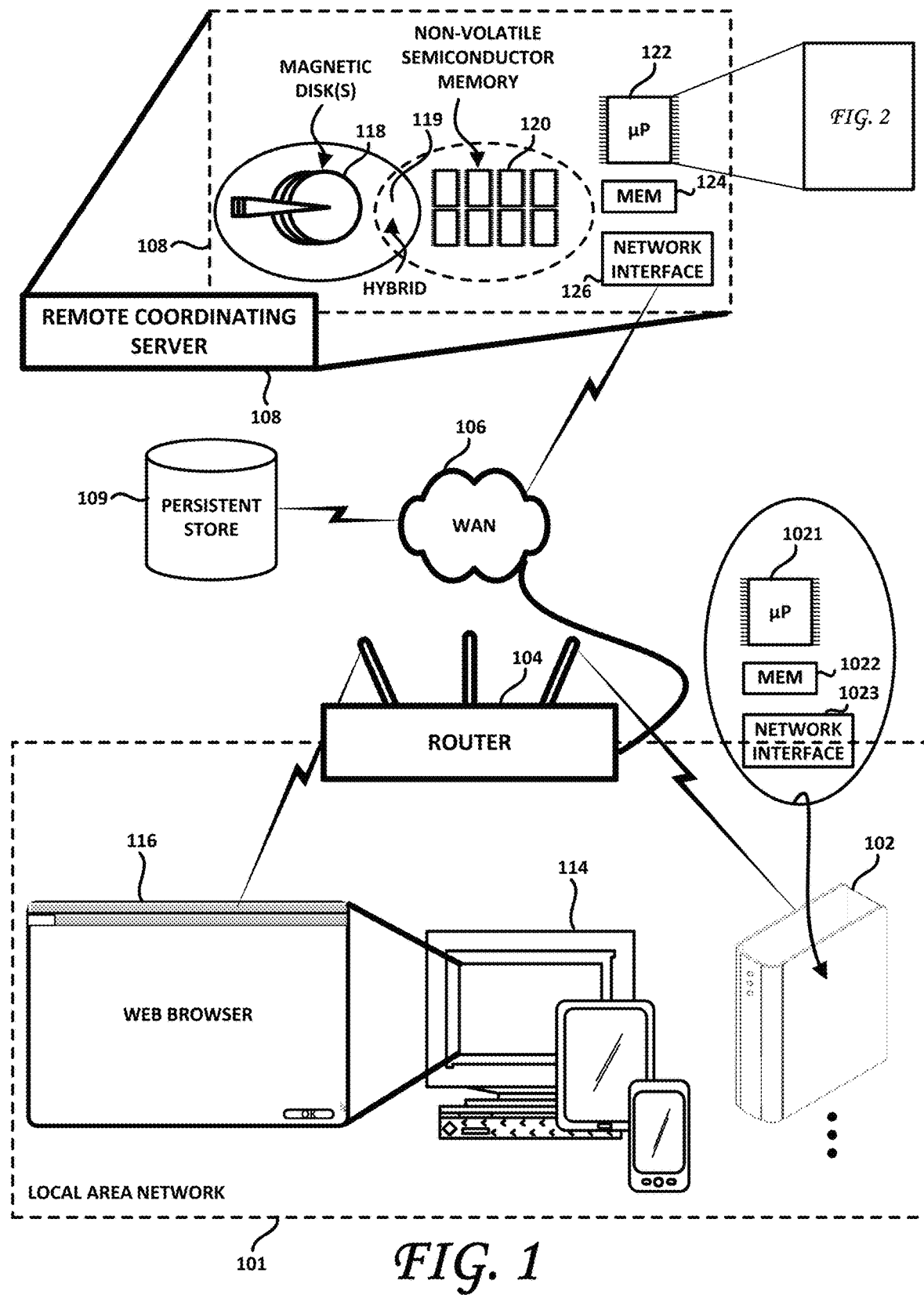
FIG. 1 is a block diagram of a system according to one embodiment.

FIG. 1 is a block diagram of a system according to one embodiment. As shown therein, an electronic device 102 may be coupled to a private network (e.g., a user's local area network (LAN)) 101. The electronic device 102 may be coupled to the private network 101 through a wired or wireless connection. In one implementation, the electronic device 102 may comprise a NAS, a Storage Attached Network (SAN) a redundant array of inexpensive disks (RAID), or most any network-aware electronic device. Alternatively, electronic device 102 may be any network aware device embedded with electronics, software, sensors and connectivity to enable it to exchange data with the manufacturer, operator and/or other connected devices. The electronic device 102 may be uniquely identifiable through its embedded computing system and may be configured to interoperate within an existing network infrastructure, including LAN 101 and a wide area network (WAN) such as the Internet.

The electronic device 102 may be coupled to a networking device such as a router 104, configured to forward data packets between LAN 101 and the WAN 106. Other devices may be located on the LAN 101 such as, for example, computing device 114. Computing device 114 may comprise a computer and a display. The computing device may take many forms including, for example, a tablet computer, a desktop computer, a laptop computer or a mobile device such as a smartphone. The computing device 114 may be configured to run a browser, such as shown at 116 in FIG. 1.

A remote coordinating server 108 may be coupled to the WAN 106. The remote coordinating server 108 may comprise of one or more physical and/or virtual computing devices and may be implemented at least partially in hardware and/or software. According to one embodiment, the remote coordinating server 108 may include mass storage. The mass storage, according to one embodiment, may comprise a Hard Disk Drive (HDD) 118 comprising one or more rotating magnetic disks. The mass storage of the remote coordinating server 108 may also or alternatively include non-volatile (e.g., Flash-based) memories 120. Alternatively still, the mass storage of the remote coordinating server 108 may comprise one or more hybrid storage devices 119, each comprising both magnetic disks 118 and non-volatile semiconductor memory 120. As also shown in FIG. 1, the remote coordinating server 108 may comprise one or more microprocessor 122, coupled to the mass storage, to a memory 124 and to a network interface 126. The microprocessor(s) 122 may be configured to execute instructions configured to implement an embodiment, as described herein relative to FIGS. 1 and 2.

On-boarding may refer to or comprise the process of customizing the generalized software available in off-the-shelf electronic devices (such as NASs) to user preference. One embodiment makes use of remote coordinating server 108 to collect information from the electronic device and/or a client computing device 124 to prepopulate many of the onboarding information fields, to enable the user to quickly and efficiently finish the onboarding process. Indeed, one embodiment allows sandboxed applications such as web browser 116 to use networking protocols in association with a remote coordinating server such as shown at 108 to automatically and accurately detect and on-board electronic devices such as 102 in a private network such as LAN 101. This process, according to one embodiment, results in newly-connected and accessible electronic device 102 sending identity information to remote coordinating server 108, thereby enabling the remote coordinating server 108 to register the electronic device 102 on the network and render it accessible to the user. One embodiment enables the remote coordinating server 108 to pull required information directly from the electronic device 102 and to allow the user to request details of the electronic device 102 from the browser 116. Thereafter, the web browser 116 can facilitate the on-boarding of the electronic device through, for example, prepopulating the electronic device 102 using information retrieved from the electronic device 114 and/or from the remote coordinating server 108.

According to one embodiment, the electronic device 102 in the private network 101 may send, via networking device 104, a first communication to the remote coordinating server 108 on the WAN 106. This first communication may comprise the address of the electronic device on the private network 101. This address may be an address on the LAN 101 such as, for example, 192.168.0.10, which is an address that is only valid on the LAN 101. This first communication may have been sent by the electronic device to the remote coordinating server 108 because the electronic device is a newly-purchased electronic device that is newly coupled to the LAN 101. Alternatively, the electronic device 102 may be a previously used device that is connected for the first time to the private network 101. Alternatively still, the electronic device 102 may be a pre-existing device on the local area network, but at a new address. According to another embodiment, the electronic device 102 may periodically (or responsive to a predetermined event) send the first communication containing its address on the LAN 101 to the remote coordinating server 108, for any reason.

Upon receipt of the first communication from the electronic device 102, the remote coordinating server 108 may store, in a persistent store 109 (such as, for example, a database or a memcache), a first identifier associated with the address of the electronic device on the public network (such as WAN 106) and the received address of the electronic device on the private network 101. The persistent store 109 may be within the remote coordinating server 108, coupled thereto or otherwise accessible thereto over a computer network such as shown at 106. Alternatively, the persistent store 109 may be within the same data center as the remote coordinating server and may be accessible over a LAN. The remote coordinating server 108 may extract the address of the router 104 from the packets of the first communication issued by the electronic device 102. This extracted address may be or include the Internet Protocol (IP) address of the router 104. The remote coordinating server may also store, in the persistent store 109, the address of the electronic device 102 in the LAN 101 (or an encrypted version thereof), which address was at least part of the payload of the packets of the first communication received by the remote coordinating server 108. According to one embodiment, the remote coordinating server 108 may store the private address(es) of the electronic device(s) 102 in the private network 101 in a record (e.g., in a row or rows of a database, key value of a memcache) of the persistent store 109 associated with or related to the public address of the electronic device on the public network 106. The stored public address of the electronic device 102 on the public network 106 may, therefore, act as an index or key into the persistent store 109 to retrieve therefrom the corresponding private address(es) (which may be encrypted) of the electronic devices 102 on the private network 101.

According to one embodiment, this first communication may be auto-generated by the electronic device 102 upon detecting a triggering event such as, for example, being newly-connected to private network 101. The electronic device 102 may, according to one embodiment, have prior knowledge of the remote coordinating server 108 and its IP address on the WAN 106. For example, the remote coordinating server 108 may have been configured by the manufacturer of the electronic device 102 and the address thereof may have been pre-loaded onto the electronic device 102 to allow just such auto-generated first communication to the remote coordinating server 108. Indeed, such first communication, according to one embodiment, may be carried out well before any on-boarding attempt is carried out, via the browser 116 of computing device 114 or otherwise.

Sometime later, perhaps when the user has initiated the on-boarding procedure, the remote coordinating server may receive, over the public network 106, a first request from browser 116 running on computing device 116. It is to be noted that the computing device 116 is a different device than electronic device 102. Such first request, issued by browser 116 and received by remote coordinating server 108, may be characterized as a first on-boarding request; that is, a request intended to at least initiate the on-boarding procedure of the electronic device 102 on the private network 101. It is to be noted that the first request is passed between private network 101 and public network 106 via the router 104.

Based upon a second identifier associated with the first request from the browser 116, the remote coordinating server 108 may retrieve the previously-stored private address or addresses of the electronic device or devices 102 on the private network 101. In this regard, it is to be noted that the packets of this first request from browser 116 include the same public address as did the packets of the previously sent and received first communication from the electronic device 102 to the remote coordinating server 108. According to one embodiment, therefore, the second identifier may be or may be related to this same public address. According to one embodiment, the remote coordinating server 108 may extract, from the first request received from the browser 116, the public IP address of the computing device 114, which is the public IP address of the router 104, which is the same networking device, at the same public address, that routed the packets of the prior first communication from the electronic device 102 to the remote coordinating server 108. In this manner, the remote coordinating server 108 may use the public address extracted from this received first request to index into the persistent store 109 and to retrieve therefrom the private address of the electronic device 102 in the private network 101, which private address was previously stored in a record of persistent store 109 corresponding to or associated with the public address extracted from first request (and previously extracted from the first communication from the electronic device 102 to the remote coordinating server 108). Now in possession of the retrieved private address of the electronic device 102 and responsive to the received first request from the browser 116, the remote coordinating server 108 may send this retrieved private address, over the public network 116 to the browser 116 as well as, optionally, additional information such as product model and device name, for example. In the case in which there are multiple devices that are found for the same public IP address, this information may be useful to enable the user to easily select the proper device. This retrieved private address may require decryption if previously encrypted. The browser 116, and thus the computing device 114, is now in possession of the private address of the electronic device 102 and may initiate or continue the on-boarding procedures to fully configure and allow access to the electronic device, over both the public network 106 and the private network 101.

According to one embodiment, the first identifier extracted by the remote coordinating server 108 from the first communication received from the electronic device may be or may include the address of the electronic device 102 (e.g., that of the router 104) on the public network 106. For privacy, however, this first identifier may be or may comprise a hash of the address of the electronic device 102 on the public network 106. Similarly, the second identifier extracted from the first request received from browser 116 by the remote coordinating server 108 may be or may comprise the address of the computing device 114 (e.g., that of the router 104) on the public network 106. For privacy, however, this second identifier may be an encrypted or obfuscated version of the address of the computing device 104 on the public network 106. To enable the remote coordinating server 108 to index into the persistent store 109 using the second identifier, the hashing algorithm used to scramble the public address extracted from the first communication from the electronic device 102 may be the same hashing algorithm as that used to scramble the public address extracted from the first request received from the browser 116 of computing device 114. If different hashing algorithms are used to scramble the extracted public addresses, a mechanism should be instituted to enable the remote coordinating server 108 to associate one with the other, to enable the remote coordinating server to index into the persistent store, to identify the record in which the private address of the electronic device 102 is stored and to retrieve that private address and provide the same to the computing device 114 responsive to the first request from the browser 116.

According to one embodiment, the first communication received by the remote coordinating server 108 from the electronic device 102 may comprise or contain more than just the private address of the electronic device 102 on the private network 101. Indeed, according to one embodiment, this first communication may also contain a third identifier of the electronic device, a name of the electronic device and/or select characteristics of the electronic device 102. This third identifier may be human-observable. Examples of human-observable third identifiers may include, for example, a serial number of the electronic device 102 or any other identifier such as a Media Access Control (MAC) address of the electronic device and/or any other human-perceptible indication printed on the device or the packaging thereof. The select characteristics of the electronic device may comprise selected items from the electronic device's specifications and/or any other characteristics that may be useful in on-boarding and/or otherwise configuring the electronic device 102 for access and use. Such third identifier, name and/or select characteristics contained in the first communication from the electronic device 102 to the remote coordinating server 108 may also be stored in the persistent store 109 at a location associated with the (optionally hashed) public address extracted from the first communication from the electronic device 102 and accessed using the matching public address (also optionally hashed or otherwise scrambled or obfuscated) extracted from the first request from the browser 116.

According to one embodiment, the information sent by the electronic device 102 to the remote coordinating server 108 may be updated. Indeed, according to one embodiment, the remote coordinating server 108 may be further configured to receive, over public network 106, a second communication from the electronic device 102 on the same private network 101 or on another private network. The second communication may comprise an updated private address of the electronic device 102 on the private network 101 or on the other private network. Upon receipt of this second communication, the remote coordinating server 108 may store, in the persistent store 109, an updated first identifier associated with the updated address of the electronic device 102 on the public network 106 (which may be the same or different from the previously-stored first identifier) and the received updated address of the electronic device 102 on the private network 101 or on the other private network. This second communication from the electronic device 102 to the remote coordinating server 108 may be carried out by the electronic device 102 automatically; that is, without human intervention.

The remote coordinating server 108 may, at some later time, receive receiving, over the public network 106, a second request from the browser 116 (or from another browser running on computing device 114 or on another computing device). Based upon an updated second identifier associated with the second request from the browser 116 or another browser, the remote coordinating server 108 may retrieve from the persistent store 109 the stored updated private address of the electronic device 102 on the private network 101 or some other private network. The updated second identifier may be or may comprise the extracted public address of the electronic device 102 on the public network 106, or a hash or a scrambled or otherwise obfuscated version thereof. In response to the received second request from the browser 116 or the other browser, the remote coordinating server 108 may then send, over the public network 106; the retrieved updated address of the electronic device 102 on the private network 101 or on the other private network, as well as additional information such as, for example, the device name and product model.

If this process fails to register the electronic device 102 (such as a NAS) with the remote coordinating server 108, the user may log onto the server's website ((e.g., MyCloud.com in the case in which the remote coordinating server is a Western Digital Corp. server), and manually register and on-board his or her electronic device 102 through a guided setup procedure. According to one embodiment, the remote coordinating server 108 may provide code (such as JavaScript, for example), which may be executed within the browser to scan devices on the user's private network 101 for default names with which the remote coordinating server knows the electronic device 102 may be initially configured.

According to one embodiment, therefore, when in the user's private network (e.g., LAN) environment, the electronic device 102 may send (in a first communication) its identify information, including IP address, MAC address, name, serial number and/or other pieces of information to a remote coordinating server 108 over a WAN 106. The remote coordinating server 108 may then detect this registration request and may then register the electronic device 102 in its persistent store 109, with the identity information and the network routing details. When the user later connects, in a first request, to a designated Universal Resource Locator (URL) (e.g. MyCloud.com) from a browser 116, the user may then be automatically presented with website that is personalized to his or her electronic device information. This website may be at the remote coordinating server 108 or at some other location, and may already be personalized with the serial number, name and/or MAC address (among other possibilities) of his or her electronic device 102. From this personalized website, the user may complete the device configuration and/or initial setup process using the familiar web browser 116, to complete the onboarding process via communications between the browser 116 and the electronic device 102. The user and/or the remote coordinating server or other authorized users may then access the electronic device 102 over the WAN 106 or LAN 101, based on network availability. Likewise, the remote coordinating server 108 may then also pull data from the electronic device 102 and provide the user with, for example, a listing of all shares, files, directories, histories of upload, downloads, etc. Alternatively, other clients (e.g., an app on a mobile device) may then pull data from the electronic device 102.

According to an embodiment, any changes in the user's local network, such as a change to the public or private IP address of the electronic device 102 may be timely communicated to the remote coordinating server 108. Similarly, any changes in the identity of the electronic device such as device name or device capability may also, according to one embodiment, be communicated to the remote coordinating server 108 in a timely manner, without user intervention. Also, any change in the public IP address of the router 104 to which the electronic device 102 is connected may also be automatically communicated to the remote coordinating server 108. To help ensure privacy and to avoid data breaches, in one embodiment, some or all of the information passed through the remote coordinating server 108 may be hashed and/or otherwise anonymized. Moreover, communications to the remote coordinating server 108 may be further validated with unique headers, to further reduce potential external threats. Alternatively, other methods and protocols may be used (such as HTTPS, for example) to provide authentication, validation and/or other services.

Figure 2:
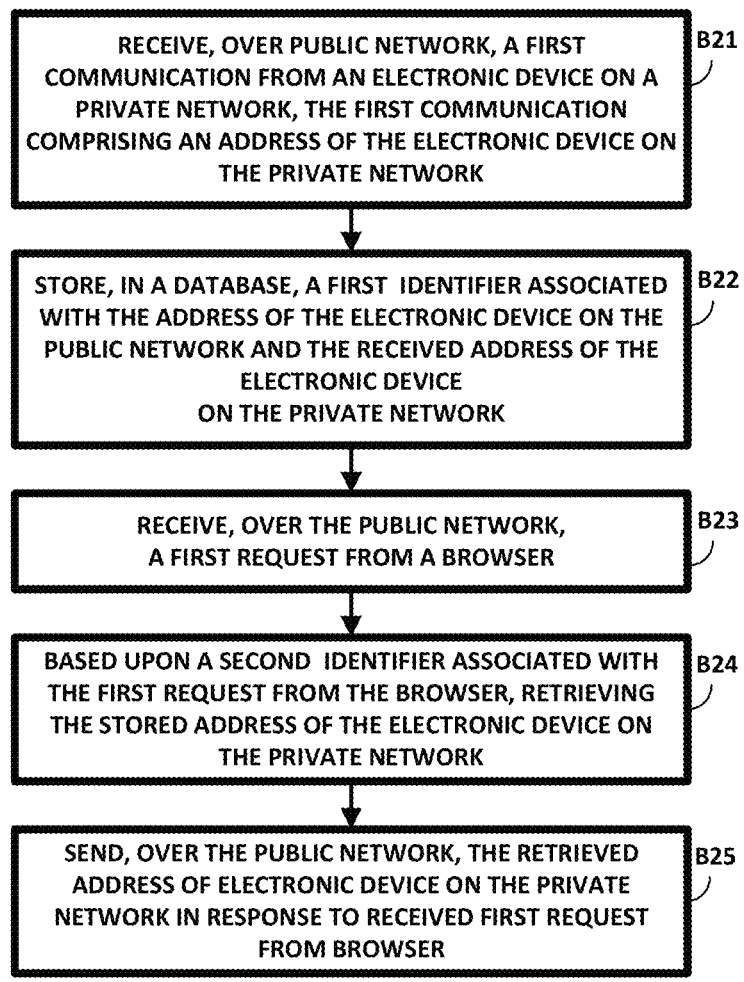
FIG. 2 is a flow chart of a method according to one embodiment.

FIG. 2 is a flow chart of a method according to one embodiment. As shown therein, block B21 calls for receiving, over a public network, a first communication from an electronic device on a private network. As detailed above, the first communication may comprise at least an address of the electronic device on the private network. As shown in block B22, the method may further comprise storing, in a persistent store, a first identifier associated with the address of the electronic device on the public network and the received address of the electronic device on the private network. At some later time, as shown at B23, the remote coordinating server 108 may receive, over the public network, a first request from a browser. It is to be understood that the browser runs on a computing device that is different than the electronic device. Thereafter, based upon a second identifier associated with the first request from the browser, the remote coordinating server may retrieve the stored address(es) of the electronic device(s) on the private network, as shown at B24. Lastly, block B25 calls for sending, over the public network; the retrieved address of the electronic device on the private network in response to the received first request from the browser. The user may now manage his or her newly-discovered, registered and configured electronic device through the familiar environment of his or her web browser.

Another embodiment is a data storage device such as the NAS 102 depicted in FIG. 1. Such a NAS 102 may comprise memory 1022 storing a public network address for a remote coordinating server and an identifier for the NAS, a network interface 1023 and one or more processors 1021. The processor(s) 1021, according to one embodiment, may be configured to during an initial setup process on a private network, determine the private network address of the NAS 102 and transmit the private network 101 address and the identifier to the remote coordinating server, with the remote coordinating server 108 is located on a public network 106 (that is different from the private network 101). A network communication may be received, at the private network address of the NAS 102, from a computing device 114 on the private network 101, with the private network address having been obtained by the computing device 114 from the remote coordinating server 108. In response to receiving the network communication from the computing device (or some time thereafter), the NAS 102 may provide an interface (for displaying an end user license, to enable configuration information to be entered, etc.) to the computing device 114. The NAS 102 may then be configured using the interface from user input and/or may be at least partially automatically or programmatically configured. For example, the one or more processors 1021 may be further configured to pre-populate fields corresponding to the language of the requesting browser, the time zone in which the NAS resides and/or the current time, among many possibilities. Such information may have been obtained from the electronic device 114, from the coordinating server 108 and/or from other sources.

According to one embodiment, the method provides an intuitive and automatic pathway for on-boarding of NASs and other electronic device that does not require the user to manually register his or her device on the network, thereby taking this complexity away from the user and rendering the process of onboarding an electronic device a seamless process. Advantageously, the present device discovery mechanism according to one embodiment works without necessitating or relying on the use of network broadcast technologies such as Bonjour or DLNA. These technologies may have limited effectiveness due to router behavior or browser constraints, as most of the modern routers may readily be configured to disallow broadcasting for security and performance reasons. Although embodiments have been presented herein in terms of network attached storage devices, other electronic devices may be on-boarded according to embodiments. For example, the embodiments shown and described herein may be practiced to good advantage on or with other types of networked devices with limited input capability such as, for example, IP telephones, routers, switches, access points, networked-TV tuners, etc.

Moreover, according to one embodiment, no modification and/or installation of new software is required on the computing device 114 in order to perform the setup of, configure or on-board the NAS or other electronic device. Indeed, the computing device 114 may be configured to communicate with the electronic device 102 using pre-existing software installed on the computing device 114 prior to the initial setup process.

Herein, the use of ordinal qualifiers such as "first", "second", "third" is not necessarily intended to connote sequentiality or any particular ordering. Rather, such qualifiers may be interpreted solely as distinguishing one quantity from another.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A computer-implemented method performed by a remote coordinating server for on-boarding electronic devices, the method comprising:
   in response to a failure of an electronic device on a private network to automatically register with the remote coordinating server, receiving over a public network from a computing device on the private network, a request to register and on-board the electronic device;
   in response to receiving the request, sending code to the computing device on the private network, the code configured to execute within a browser operating on the computing device and cause the computing device to scan the private network for the electronic device;
   receiving, over the public network, a first communication comprising an address of the electronic device on the private network;
   determining an address of the electronic device on the public network based, at least in part, on the first communication;
   storing, in a persistent store, a first identifier associated with the address of the electronic device on the public network, on-boarding information, and the address of the electronic device on the private network;
   receiving, over the public network, a first request to initiate an on-boarding process from the browser operating on the computing device; and
   in response to receiving the first request:
      based upon a second identifier associated with the first request from the browser, retrieving the stored address of the electronic device on the private network;
      sending, over the public network to the computing device, the retrieved address of the electronic device on the private network to facilitate a connection between the browser and the electronic device during the on-boarding process; and
      sending, over the public network to the computing device, the on-boarding information to cause the browser to automatically pre-populate one or more fields of a webpage associated with the electronic device and used during the on-boarding process with the on-boarding information without additional user input.

2. The computer-implemented method of claim 1, wherein the first identifier comprises one of the address of the electronic device on the public network and a hash of the address of the electronic device on the public network.

3. The computer-implemented method of claim 1, wherein the second identifier comprises one of an address of the computing device on the public network and an encrypted version of the address of the computing device on the public network.

4. The computer-implemented method of claim 1, wherein the first communication further comprises at least one of a third identifier of the electronic device, a name of the electronic device, and select characteristics of the electronic device.

5. The computer-implemented method of claim 4, wherein the third identifier is human-observable.

6. The computer-implemented method of claim 4, wherein storing further comprises storing, in the persistent store, the at least one of the third identifier of the electronic device, the name of the electronic device, and the select characteristics of the electronic device.

7. The computer-implemented method of claim 1, wherein retrieving the stored address of the electronic device on the private network comprises:
   matching the second identifier associated with the first request from the browser with the stored first identifier associated with the address of the electronic device on the public network; and
   upon determining a match, retrieving the address of the electronic device on the private network stored in a record of the persistent store associated with the matching first and second identifiers.

8. The computer-implemented method of claim 1, wherein the electronic device comprises a data storage device.

9. The computer-implemented method of claim 1, further comprising:
   receiving, over the public network, a second communication from the electronic device on the private network or an other private network, the second communication comprising an updated address of the electronic device on the private network or on the other private network;
   storing, in the persistent store, an updated first identifier associated with an updated address of the electronic device on the public network and the received updated address of the electronic device on the private network or on the other private network;
   receiving, over the public network, a second request from the browser or an other browser;
   based upon an updated second identifier associated with the second request from the browser or the other browser, retrieving the stored updated address of the electronic device on the private network or on the other private network; and
   sending, over the public network, the retrieved updated address of the electronic device on the private network or on the other private network in response to the received second request from the browser or the other browser.

10. The computer-implemented method of claim 1, wherein the pre-populated one or more fields comprise at least one of language information, time zone information, and time information obtained from at least one of the electronic device and the computing device.

11. A computing system, comprising:
    a network interface; and
    one or more processors configured to:
       in response to a failure of an electronic device on a private network to automatically register with a remote coordinating server, receive over a public network from a computing device on the private network, a request to register and on-board the electronic device;
       in response to receiving the request, send code to the computing device on the private network, the code configured to execute within a browser operating on the computing device and cause the computing device to scan the private network for the electronic device;
       receive, over the public network, a first communication comprising an address of the electronic device on the private network;

determine an address of the electronic device on the public network based at least in part on the first communication;

store, in a persistent store, a first identifier associated with the address of the electronic device on the public network, on-boarding information, and the address of the electronic device on the private network; and in response to receiving the first request:
receive, over the public network, a first request to initiate an on-boarding process from the browser operating on the computing device;
based upon a second identifier associated with the first request from the browser, retrieve the stored address of the electronic device on the private network;
send, over the public network to the computing device, the retrieved address of the electronic device on the private network to facilitate a connection between the browser and the electronic device during the on-boarding process; and
send, over the public network to the computing device, the on-boarding information to cause the browser to automatically pre-populate one or more fields of a webpage associated with the electronic device and used during the on-boarding process with the on-boarding information without additional user input.

12. The computing system of claim 11, wherein the first identifier comprises one of the address of the electronic device on the public network and a hash of the address of the electronic device on the public network.

13. The computing system of claim 11, wherein the second identifier comprises one of an address of the computing device on the public network and an encrypted version of the address of the computing device on the public network.

14. The computing system of claim 11, wherein the first communication further comprises at least one of a third identifier of the electronic device, a name of the electronic device, and select characteristics of the electronic device.

15. The computing system of claim 14, wherein the third identifier is human observable.

16. The computing system of claim 14, wherein the one or more processors are further configured to store, in the persistent store, the at least one of the third identifier of the electronic device, the name of the electronic device, and the select characteristics of the electronic device.

17. The computing system of claim 11, wherein the one or more processors are further configured to:
match the second identifier associated with the first request from the browser with the stored first identifier associated with the address of the electronic device on the public network; and
in response to determining a match, retrieve the address of the electronic device on the private network stored in a record of the persistent store associated with the matching first and second identifiers.

18. The computing system of claim 11, wherein the electronic device comprises a data storage device.

19. The computing system of claim 11, wherein the one or more processors are further configured to:
receive, over the public network, a second communication from the electronic device on the private network or an other private network, the second communication comprising an updated address of the electronic device on the private network or on the other private network;
store, in the persistent store, an updated first identifier associated with an updated address of the electronic device on the public network and the received updated address of the electronic device on the private network or on the other private network; receive, over the public network, a second request from the browser or an other browser;
based upon an updated second identifier associated with the second request from the browser or the other browser, retrieve the stored updated address of the electronic device on the private network or on the other private network; and
send, over the public network, the retrieved updated address of the electronic device on the private network or on the other private network in response to the received second request from the browser or the other browser.

20. The computing system of claim 11, wherein the pre-populated one or more fields comprise at least one of language information, time zone information, and time information obtained from at least one of the electronic device and the computing device.

21. A computing system, comprising:
a network communication means; and
a processing means configured to:
in response to a failure of an electronic device on a private network to automatically register with a remote coordinating server, receive over a public network from a computing device on the private network, a request to register and on-board the electronic device;
in response to receiving the request, send code to the computing device on the private network, the code configured to execute within a browser operating on the computing device and cause the computing device to scan the private network for the electronic device;
receive, over the public network, a first communication comprising an address of the electronic device on the private network;
determine an address of the electronic device on the public network based at least in part on the first communication;
store, in a persistent store, a first identifier associated with the address of the electronic device on the public network, on-boarding information, and the address of the electronic device on the private network; and
in response to receiving the first request:
receive, over the public network, a first request to initiate an on-boarding process from the browser operating on the computing device;
based upon a second identifier associated with the first request from the browser, retrieve the stored address of the electronic device on the private network;
send, over the public network to the computing device, the retrieved address of the electronic device on the private network to facilitate a connection between the browser and the electronic device during the on-boarding process; and
send, over the public network to the computing device, the on-boarding information to cause the browser to automatically pre-populate one or more fields of a webpage associated with the electronic device and used during the on-boarding process with the on-boarding information without additional user input.

* * * * *